R. E. ARNOLD & C. P. HOCKETT.
SPRING WHEEL.
APPLICATION FILED APR. 26, 1909.
994,297.
Patented June 6, 1911.
2 SHEETS—SHEET 1.
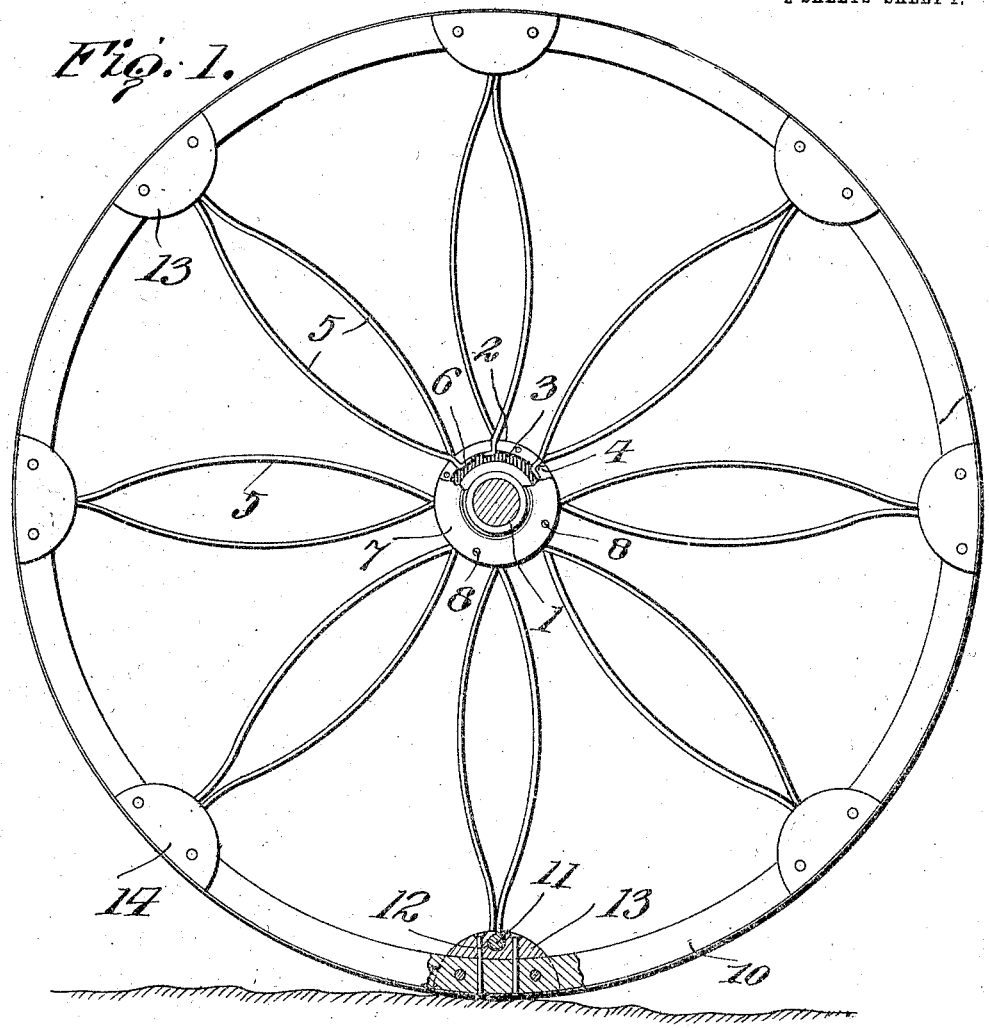

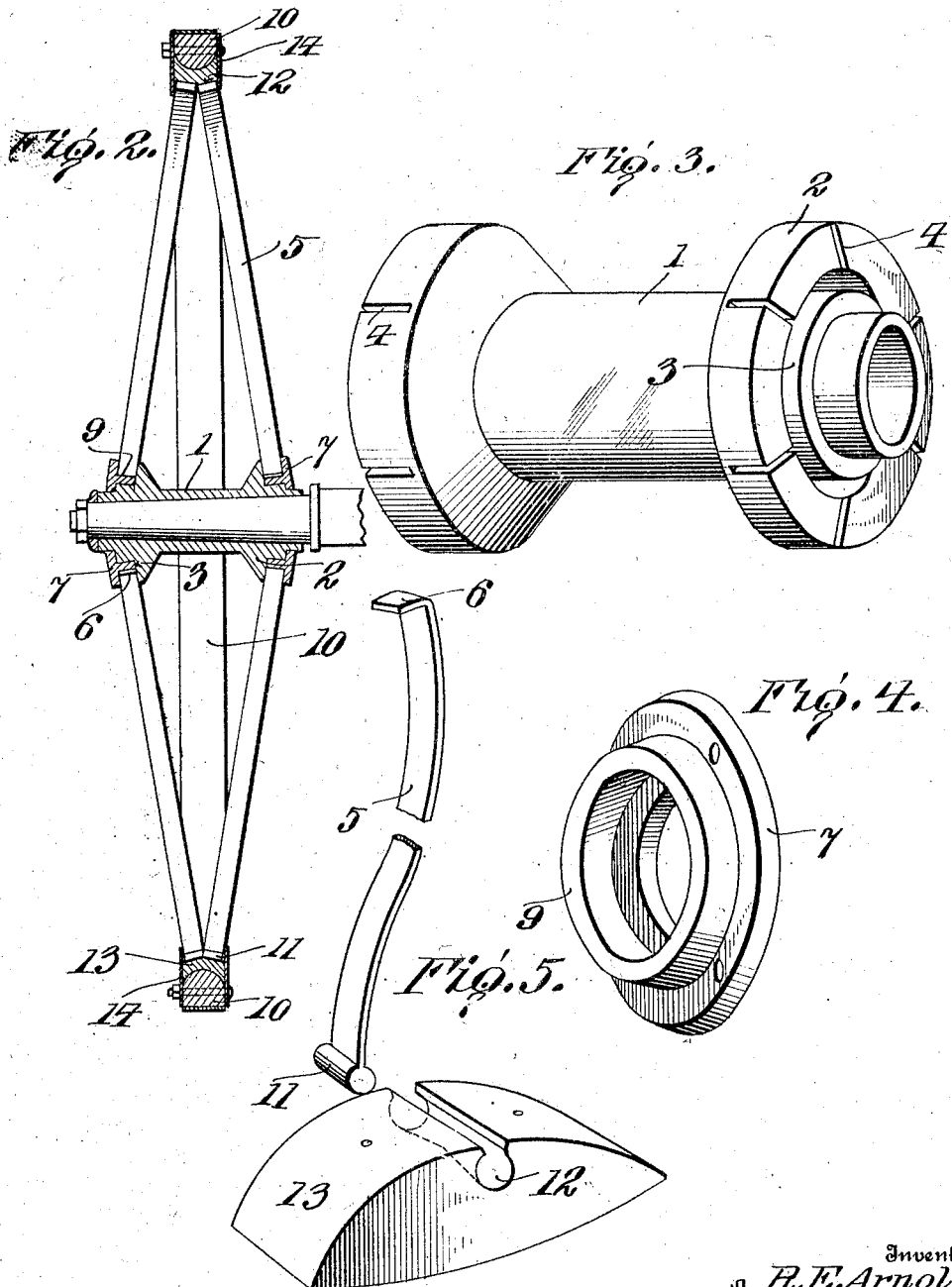

UNITED STATES PATENT OFFICE.

REX E. ARNOLD AND CLARKSON P. HOCKETT, OF KOUTS, INDIANA.

SPRING-WHEEL.

994,297.　　　　Specification of Letters Patent.　　Patented June 6, 1911.

Application filed April 26, 1909. Serial No. 492,215.

*To all whom it may concern:*

Be it known that we, REX E. ARNOLD and CLARKSON P. HOCKETT, citizens of the United States, both residing at Kouts, in the county of Porter and State of Indiana, have invented certain new and useful Improvements in Spring-Wheels, of which the following is a specification.

This invention comprehends certain new and useful improvements in vehicle wheels of that type designed particularly for use on automobiles or the like, and the invention has for its object an improved device of this character embodying a plurality of spring-spokes which afford sufficient resiliency of structure to admit of the rim of the wheel moving into eccentric relation to the hub, whereby to absorb the shocks incident to travel without employing a pneumatic tire that is liable to puncture and is otherwise objectionable.

A further object of the invention is an improved wheel in which the spokes are secured in such a manner as to be susceptible of being readily removed and replaced by new ones without employing skilled labor, the wheel being also comparatively simple in structure, so as to be capable of being easily and cheaply manufactured.

With these and other objects in view that will more fully appear as the description proceeds, the invention consists in certain constructions and arrangements of the parts that we shall hereinafter fully describe and then point out the novel features thereof in the appended claim.

For a full understanding of the invention and the merits thereof and also to acquire a knowledge of the details of construction, reference is to be had to the following description and accompanying drawing, in which:

Figure 1 is a side elevation of a wheel constructed in accordance with our invention; Fig. 2 is a transverse section thereof; Figs. 3 and 4 are enlarged perspective views of the hub and cover plate respectively; and Fig. 5 is a perspective view of a spoke and block in juxtaposition.

Corresponding and like parts are referred to in the following description and indicated in all the views of the drawing by the same reference characters.

Our improved wheel embodies a hub 1 which is substantially in the form of a spool and is provided at its opposite ends with outstanding annular flanges 2. Each of the flanges is formed in its outer face with a concentric groove 3 and with a plurality of slots or channels 4 extending radially outwardly from the groove and opening through the periphery of the flange, as best seen in Fig. 3.

5 designates the spokes that are composed of flat bars of steel or other suitable resilient material, and that are arranged in two series with their inner ends fitted in the slots 4 of the respective flanges. At their inner extremities the spokes are angularly disposed, as indicated at 6, to constitute heads which are received in the grooves 3 to hold the spokes against withdrawal from the slots 4, the heads of the alternate spokes of each series facing in one circular direction, while the heads of the remaining spokes face in the opposite circular direction, such an arrangement being advantageous in that the wheel is braced during both the forward and rearward movement of the vehicle.

Annular cover plates 7 are arranged at the opposite ends of the hub and are designed to be positioned in abutting relation to the outer faces of the respective flanges and to be detachably secured thereto by screws 8 or other approved fastening means, the plates serving to close the grooves and slots to retain the spokes in position against accidental lateral displacement. Each plate is formed in its inner face with an inwardly disposed annular rib 9 which registers with the corresponding groove 3 and is arranged to impinge against the heads 6 as the cover plate is drawn up tight against the flange.

The corresponding spokes 5 of the two series are oppositely curved or bowed along radial lines and preferably converge outwardly so that their outer ends lie side by side, as will be observed by reference to Fig. 2, the spokes being connected to the rim 10 that is of any conventional form. In practice it has been found desirable to establish hinge connections between the outer ends of the spokes and the rim, so as to admit of such outer ends having a limited turning movement about transverse axes with respect to the rim, whereby to relieve the outer ends of the spokes of excessive strain as the spokes are bent abnormally under the weight of the load. To attain this object, the spokes are enlarged at their outer ends to form substantially cylindrical heads 11 that extend transversely of the respective spokes and at right angles to the length thereof, the heads of the corresponding spokes of the two series being arranged end to end and being supported in outwardly divergent relation by virtue of the outwardly convergent disposition of said spokes, as above mentioned. Each pair of adjacent heads 11 is mounted in a tubular socket 12 extending transversely of a metallic block 13, the socket having a contracted opening through the inner face of the block so as to afford the spokes sufficient play to enable the heads to turn slightly within the socket. Intermediate of its ends the socket has an angular disposition, so as to form outwardly divergent seating portions to accommodate the respective heads, the ends of the socket opening outwardly at opposite sides of the block in order to permit the heads to be slipped laterally into the seating portions and withdrawn therefrom, as occasion demands. A pair of face plates 14 abut against opposite sides of the block 13 and extend across the ends of the socket 12 to close the same and thus maintain the heads against removal, the plates being extended outwardly to lie against opposite sides of the rim and being bolted or otherwise detachably secured thereto (see Fig. 2), whereby to assist in holding the block against lateral displacement. There is a series of blocks 13 which are bolted or otherwise suitably secured at intervals to the inner face of the rim and which are equal in number to the number of pairs of corresponding spokes.

In the practical use of our improved wheel it is to be observed that the curved spring-spokes establish a yielding connection between the hub and the rim, so that when the wheel travels over rough ground the rim may assume eccentric relation to the hub, to effectually absorb shocks and prevent their transmission to the body of the vehicle, thereby supplementing the work of the vehicle springs and rendering unnecessary the use of the objectionable pneumatic tire.

Attention is directed to the fact that should one of the spring-spokes become broken, the damage may be repaired with facility, it being only necessary to detach the corresponding cover plate 7 and face plate 14, after which the said spoke may be quickly slid laterally out of place and the new one substituted therefor. Such an operation does not require the use of skilled labor and may be performed with the usual tools customarily included in an automobilist's kit, it being observed that an extra spoke may be employed to replace any one of the spokes of the wheel inasmuch as all of the spokes are substantial duplicates. Furthermore the wheel possesses to a marked degree the characteristics of simplicity, durability and strength, and is adapted to be easily and cheaply manufactured so as to be susceptible of being placed on the market at a reasonable price.

Having thus described the invention what is claimed as new is:

A resilient vehicle wheel comprising a hub, two series of spring spokes secured to the hub and formed at their outer ends with transversely disposed enlarged heads of substantially cylindrical contour, the corresponding spokes of the two series converging outwardly with their heads supported end to end and arranged in outwardly diverging relation, a rim provided with a series of sockets extending transversely thereof and opening outwardly at their opposite ends at opposite sides of the rim, each socket being disposed angularly intermediate of its ends to form outwardly divergent seating portions adapted to have the heads of a pair of corresponding spokes inserted laterally therein through the open ends of the socket, and means detachably applied to the rim for closing the open ends of the sockets to maintain the heads against accidental displacement therefrom.

In testimony whereof we affix our signatures in presence of two witnesses.

REX E. ARNOLD. [L. S.]
CLARKSON P. HOCKETT. [L. S.]

Witnesses:
M. C. McCarthy,
P. G. Ibach.